United States Patent [19]
Welling

[11] Patent Number: 5,378,364
[45] Date of Patent: Jan. 3, 1995

[54] CONICAL SCREEN BASKET CENTRIFUGE

[75] Inventor: Bruce L. Welling, Scott Depot, W. Va.

[73] Assignee: Baker Hughes Incorporated, Houston, Tex.

[21] Appl. No.: 944,520

[22] Filed: Sep. 14, 1992

[51] Int. Cl.6 .............................................. B04B 3/00
[52] U.S. Cl. .............................. 210/512.1; 210/360.1; 210/380.1; 210/380.3; 494/36
[58] Field of Search ............... 210/360.1, 380.1, 380.3, 210/498; 494/36, 52, 53

[56] References Cited

U.S. PATENT DOCUMENTS

| | | |
|---|---|---|
| 1,572,299 | 2/1926 | McEntire . |
| 1,806,241 | 5/1931 | Dupuis . |
| 2,792,172 | 5/1957 | Tait ................................... 210/360.1 |
| 3,401,800 | 9/1968 | Stock . |
| 3,713,541 | 1/1973 | Nelson . |
| 3,957,652 | 5/1976 | McGonigal . |
| 4,309,284 | 1/1982 | Morimoto et al. . |
| 4,487,695 | 12/1984 | Connolly . |
| 4,569,761 | 2/1986 | Spiewok et al. ................. 210/380.1 |
| 4,983,289 | 1/1991 | Salomon ............................ 210/380.1 |

FOREIGN PATENT DOCUMENTS

| | | |
|---|---|---|
| 2366876 | 5/1978 | France . |
| 952520 | 11/1956 | Germany . |
| 2064997 | 6/1981 | United Kingdom . |

Primary Examiner—Robert A. Dawson
Assistant Examiner—David Reifsnyder
Attorney, Agent, or Firm—Choate, Hall & Stewart

[57] ABSTRACT

A scroll centrifuge having a basket/cage combination with apertures and a screen portion. The screen portion comprising tungsten carbide ligaments arranged side-by-side and end-to-end on the inside surface of the basket/cage combination to form slots. The slots whereof communicate the interior of the basket/cage combination to the exterior.

13 Claims, 3 Drawing Sheets

CONICAL SCREEN BASKET CENTRIFUGE

FIELD OF THE INVENTION

This invention relates to solids-liquid separating centrifuges and, more particularly, to improvements in the screen section of the basket of scroll centrifuges and to the manufacture thereof.

BACKGROUND OF THE INVENTION

A scroll centrifuge is used to separate the solid and liquid phases of a slurry, such as coal fines. However, many slurries contain hard, abrasive solids which often cause wearing, plugging and breaking of the screen sections of scroll centrifuges. The basket of prior scroll centrifuges comprises a screen section which typically has been formed from stainless steel screen elements welded to circumferential ribs. The screen elements form an inner surface of substantially conical form, over which the solids are moved toward an outlet by the helical scroll. The basket which is formed out of relatively thin material is supported by a cage device which permits the screen portion to withstand the very high g-forces created when the centrifuge is operated at high rpm.

Prior art scroll centrifuges as referred to above have had extensive commercial use despite certain shortcomings, such as rapid wearing away of the screen section of the basket, particularly when exposed to hard, abrasive solids, as, for example, in the dewatering of coal fines. Typically, when the screen section is either broken, plugged or worn, the centrifuge is disassembled and the basket is replaced. This results in repeated maintenance and costly replacement of parts. The use of tungsten carbide ligaments in the screen portion of a different type of centrifuge, a screen bowl centrifuge, is disclosed in U.S. Pat. No. 4,983,289.

SUMMARY OF THE INVENTION

The present invention replaces the basket and supporting cage components of a scroll centrifuge with a single basket/cage combination having a screen portion with improved wear characteristics. The centrifuge of the present invention comprises a scroll rotatably mounted substantially concentrically within a rotating one-piece conical basket/cage combination. A screen portion is located on the inside surface of the basket/cage combination. The screen portion of the basket/cage device is formed out of a geometric arrangement of ligaments made of an abrasive resistant material, such as tungsten carbide. The ligaments have a thin rectangular shape and form slots when arranged side-by-side and end-to-end, substantially extending the full axial length of the basket. The basket/cage combination is formed of a lattice of crossing circumferential and axial ribs which form large rectangularly shaped apertures through which the liquid portion of the slurry mixture is driven. The ligaments are secured to the circumferential rib portions of the supporting basket/cage combination. The cage device is combined with the basket in order to support the heavier ligaments forming the screen portion when the centrifuge is operated at high rpm. Various geometric arrangements of the tungsten carbide ligaments may be incorporated to improve the wear characteristics of the screen portion. Utilization of the present invention results in the screen portion having a longer life and, thus, reduces the frequency of maintenance.

DESCRIPTION OF THE PREFERRED EMBODIMENT

Figure 1:
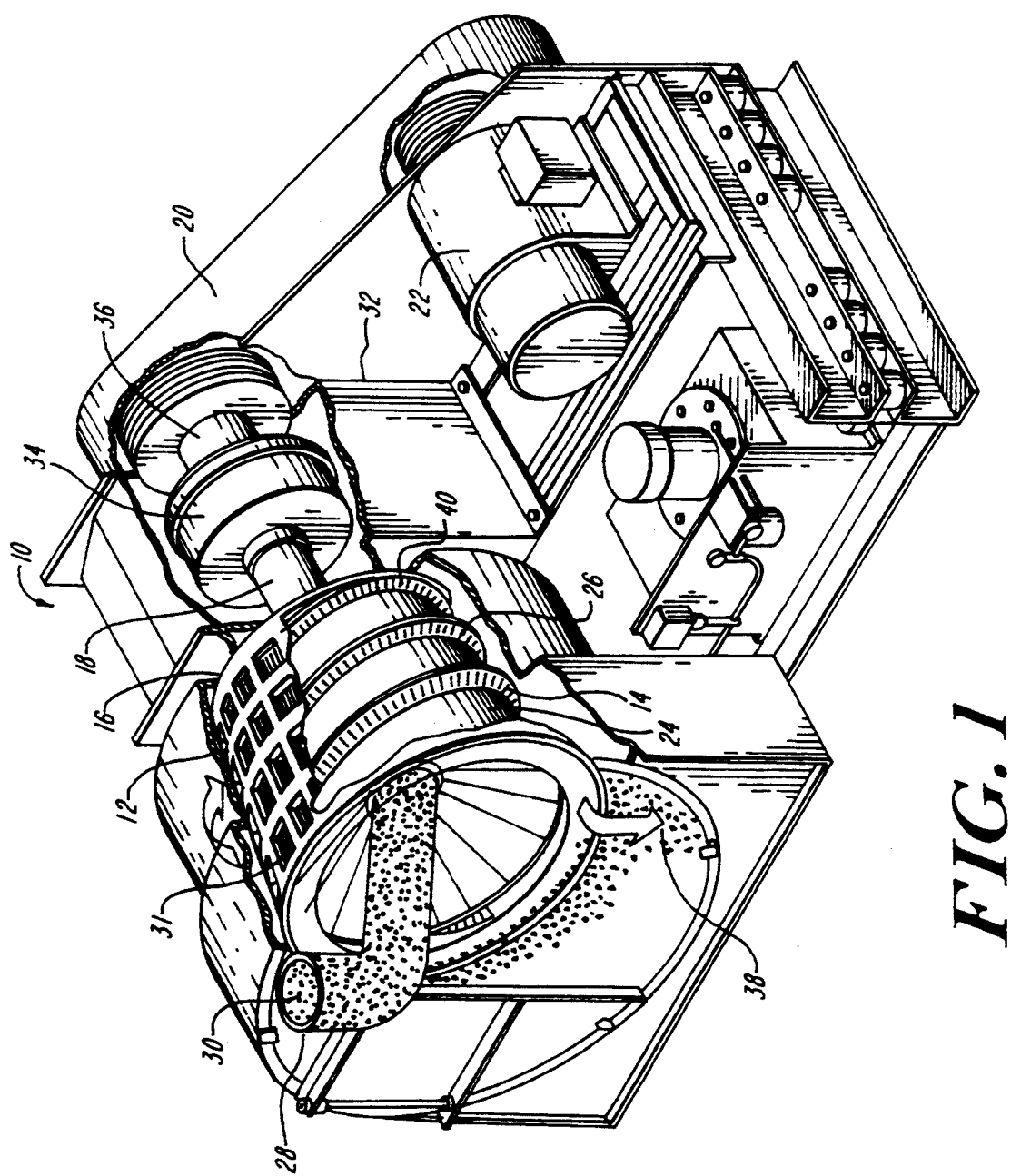
FIG. 1 is a cut-away perspective view of a scroll centrifuge in accordance with the present invention.
Figure 2:
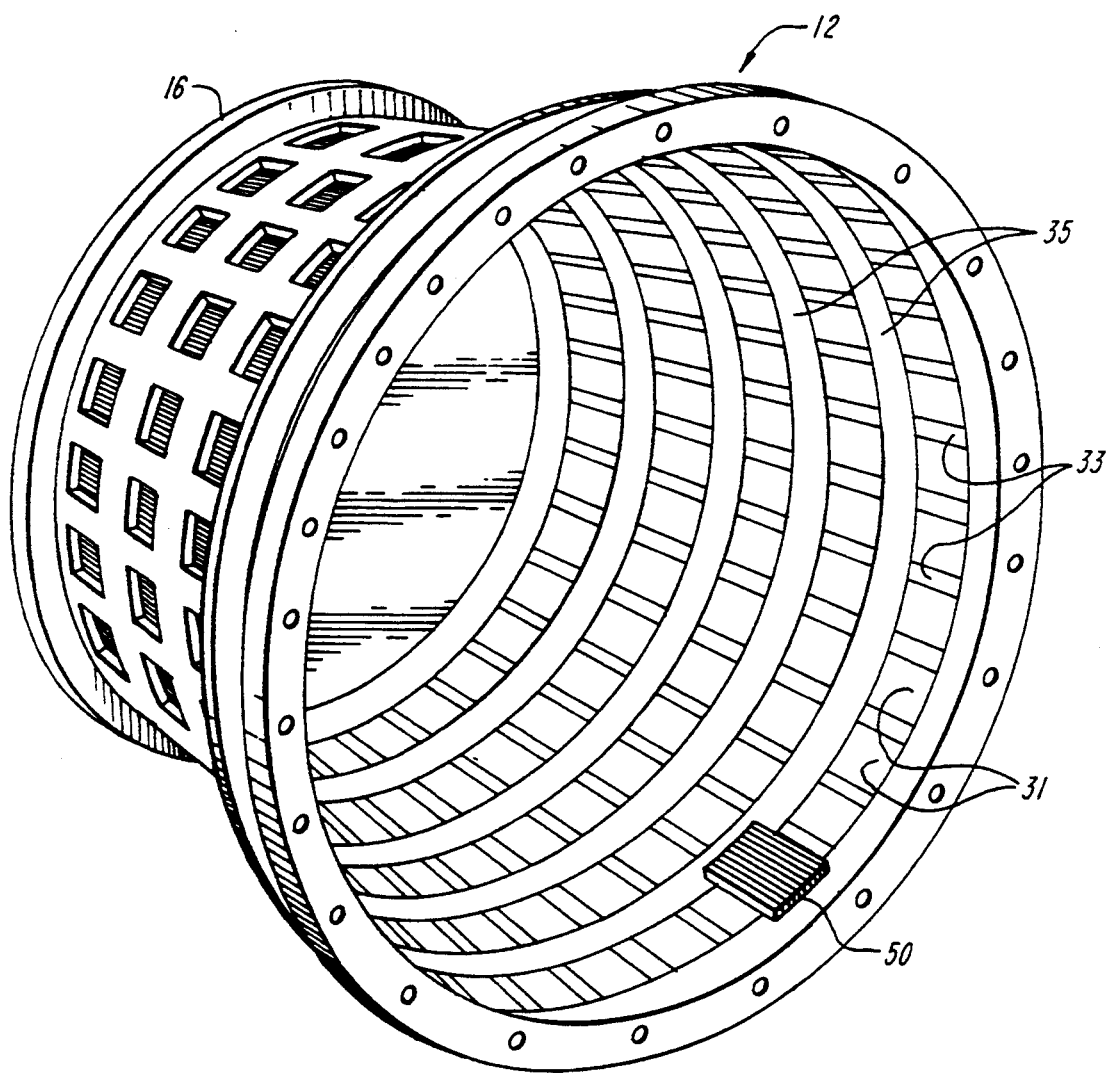
FIG. 2 is a perspective view of the basket/cage combination of the present invention.

Referring to FIGS. 1 and 2, the scroll centrifuge designated generally 10, has a basket/cage combination 12, and a helical scroll 14. A basket/cage combination head 16, is bolted at its rim to a flange (not shown) connected to a basket/cage combination drive shaft 18. The drive shaft 18 extends rotatably through bearing assembly (not shown) fixed on a mounting pedestal 32, and is connected at its outer end to drive speed change gearing unit 34.

The scroll 14 has a conical hub 24 on the exterior of which is mounted a helical scroll blade 26 extending the length of basket/cage combination 12. One end of the scroll hub 24 is connected to a sleeve shaft (not shown) extending coaxially into the combination basket/cage drive shaft 18 and mounted to bearing assembly (not shown). The sleeve shaft is connected at its outer end to drive speed change gearing unit 34. A shaft 36 extends from the speed change gearing unit 34 and is driven by belt 20 and motor 22.

Thus, the rotation of basket 12 by the motor 22 and belt 20 rotates scroll 14 in the same direction at slightly different speeds through speed change gearing unit 34. The scroll may be rotated faster or slower than the basket. In the illustrated embodiment it is driven at a slower speed than the basket. Speed change gearing unit 34 has the usual shear pin or other torque sensing system (not shown), connected at its broken-away outer end, to prevent continued operation at excessive torque loads.

A pipe 30 fixed through a support arm (not shown) delivers feed to the centrifuge 10. Pipe 30 is connected at its outer end 28 to a suitable source of feed slurry (not shown).

Basket 12 is provided with annular rows of apertures 31 therethrough, which form a lattice of narrow axial and circumferential ribs. Preferably, as shown, the apertures 31 are substantially rectangular. Axial ribs 33 are displaced radially outward from the circumferential ribs 35 in order to improve drainage of the liquid phase of the slurry. In addition to being rectangular in shape, the apertures 31 may be circular or elliptical. Discharge outlet 38 for the solids is provided at the outer end of the basket 12.

The liquid phase of the slurry passes through screen portion 50 and drains radially outward through the apertures 31. The liquid is collected in a housing (not shown) and discharged from the centrifuge 10.

The centrifuge shown is designed for treatment of slurries of highly abrasive materials such as coal fines, for which purpose, preferably, the solids engaging portion of the working face of scroll blade 26 are clad with abutting tiles 40 of a hard, more abrasion resistant material than steel of which the scroll is customarily formed, such as ceramic material or tungsten carbide, the tiles being cemented to the surfaces which they cover.

In operation of the centrifuge, the solids of the slurry, fed into the basket 12 from feed pipe 30, settle toward the basket inner wall under centrifugal force. The basket is rotated in a counter-clockwise direction viewed from the left end of FIG. 1. Since the scroll 14 is rotated in the same direction at a slightly slower speed, the scroll is in effect rotated in the opposite or clockwise direction relative to the basket (as shown by the arrow) and pushes the settled solids from right to left in FIG. 1.

Figure 3:
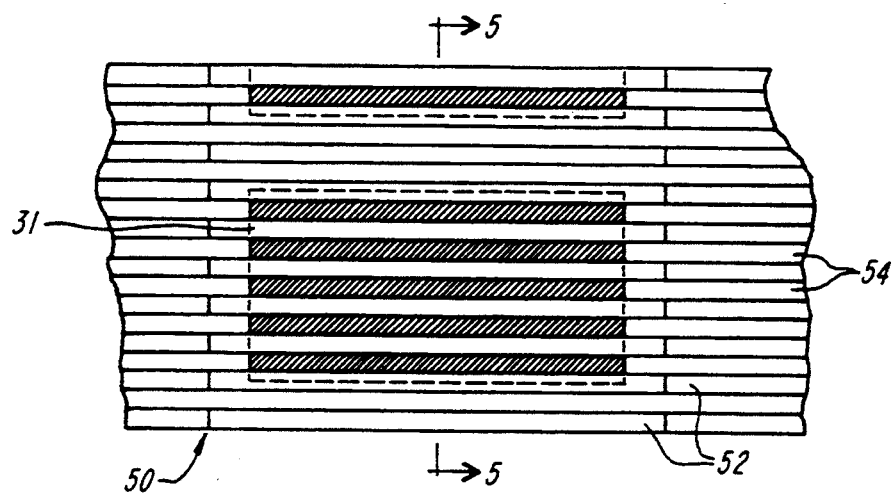
FIG. 3 is an enlarged plan view of the screen portion of the basket/cage combination.

FIG. 3 shows a section of the preferred screen portion on an enlarged scale from that used in FIGS. 1 and 2. The inside surface plan view of FIG. 3 is of a small angular and axial fragment of the screen section. As shown, the screen portion 50 is formed of bars, designated generally 52, made of wear resistant material, preferably tungsten carbide, which are of the same dimensions. A suitable tungsten carbide material has an Average Volume Loss range of 0.6 to 3.8 (mm) under the ASTM G-65 wear test. A further suitable material is an abrasion resistant ceramic.

Bars 52 are arranged in axial sets extending longitudinally within the basket the full length of the screen section, with their ends abutted at substantially the center line of the circumferential ribs intervening the apertures 31. They are of sufficient number to extend the full axial length of the screen section of the basket. These axial sets of the bars are arranged in parallel relation in circumferential pairs sufficient in number to cover the full inner circumference of the basket.

Figure 4:
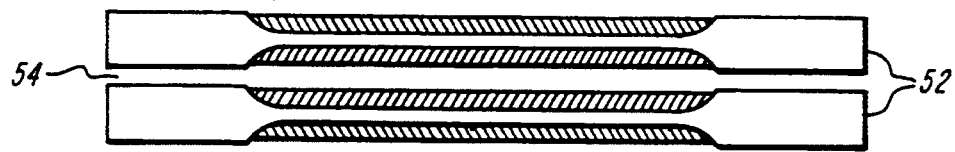
FIG. 4 is an enlarged view of two bars of the screen portion of the basket/cage combination.

FIG. 4 shows an exterior plan view of two bars of the preferred screen portion on an enlarged scale from that used in FIG. 3. As shown in FIGS. 3 and 4, the bars 52 have a shape such that when they abut one another side-by-side, they define slots 54 between themselves. Slots 54 extend the full length of the screen section up to its discharge end, and of substantially uniform circumferential spacing about the entire circumference of the screen section.

Figure 5:
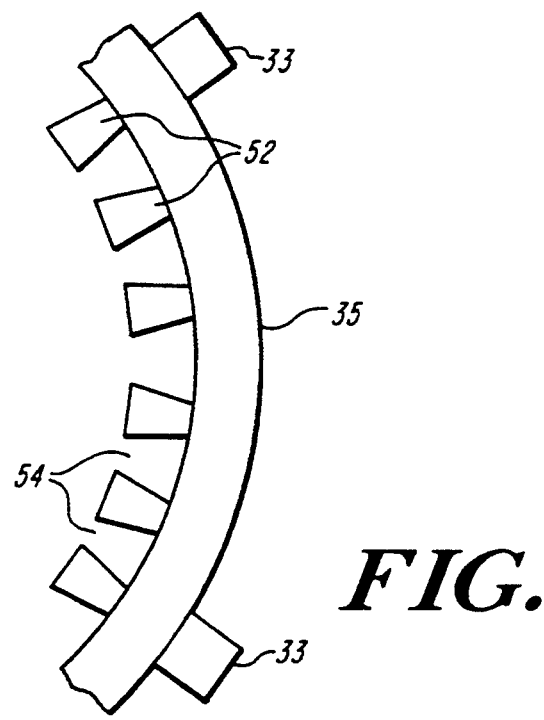
FIG. 5 is an enlarged end view of the screen portion of FIG. 3.

FIG. 5 shows an enlarged end view of the screen portion shown in FIG. 3. As shown in FIGS. 4 and 5, the bars 52 have a trapezoidal cross-section so that the width of slot 54 is greater at the exterior surface of the screen portion than the interior surface. By increasing the width of the slot in an outwardly radial direction, as shown in FIGS. 4 and 5, solid slurry material is less likely to become plugged in the slots 54. The trapezoidal cross-section of bars 52 may extend the full length of bars 52 to improve drainage, or bars 52 may have substantially square cross-sections at their ends to aid in their installation. It is further understood that bars 52 may have a longitudinal taper, to account for the conical shape of the screen portion.

The slots 54 which overlie axial sets of apertures 31 and intervening circumferential ribs of the basket function as screening slots. Even where slots 54 overlie the circumferential ribs, they tend to drain liquid to the apertures 31 at either side of the rib. It is understood that bars 52 may be arranged in such a manner that slots 54 lie along an axial path, a circumferential path or along a path which is at an angle from the axis of rotation.

Bars 52 are secured to the basket ribs which they, or end portions thereof, overlie by a thin layer of cement (not shown), preferably epoxy resin cement. As presently preferred, the bars are hand-laid. An angular segment of full length of the basket is first coated with a substantially uniform layer of the cement, the annular width of the segment being such that the laying of bars therein can be completed before the cement starts to set. A first axial set of bars is then laid from end to end of the cemented segment of the basket, care being exercised that the bars are abutted end to end with their sides parallel to the bowl axis and in axial alignment. Adjacent segments are then cemented and the bars applied thereto in alignment with bars already laid, until the entire circumference of the basket is complete. Suitable bars are available from various suppliers familiar with ASTM G-65.

A further embodiment includes bars 52 joined together to form discrete screen elements which can be inserted into apertures 31. Said screen elements are secured within apertures 31 with cement, bands or screws. Moreover, said screen elements are individually replaceable reducing maintenance costs.

What is claimed is:

1. A conical screen basket centrifuge having a rotary conical basket/cage combination with apertures and including a conical screen portion, a rotary, helically-bladed scroll mounted coaxially therein, means for rotating said basket/cage combination and scroll about their common axis in the same direction at a differential speed, means for feeding a solids-liquid slurry into said basket/cage combination and means defining an outlet from said basket/cage combination for solids moved through said screen section by said scroll, wherein said screen portion comprises, slotted screen means comprising a plurality of abrasion resistant ligaments bridging the apertures of said basket/cage combination and laterally spaced to form slots, the slots whereof communicate the interior of said screen portion with the exterior of said basket/cage combination and lie substantially along paths parallel to the common axis.

2. A centrifuge according to claim 1 wherein said ligaments are tapered in a longitudinal direction.

3. A centrifuge according to claim 1 wherein the ligaments are formed of a material having an average weight loss in the range of 0.6 to 3.8 mm$^3$ under the ASTM'G-65 wear test.

4. A centrifuge according to claim 1 wherein said ligaments are arranged to extend generally the length of the basket/cage combination.

5. A centrifuge according to claim 1 wherein said screen portion between said plurality of slots is formed of ligaments arranged in laterally spaced, endwise abutted sets to form corresponding slots.

6. A centrifuge according to claim 1 wherein the ligaments are tungsten carbide.

7. A centrifuge according to claim 1 wherein the ligaments are ceramic.

8. A centrifuge according to claim 1 wherein the slots lie along an axial path.

9. A centrifuge according to claim 1 wherein the slots lie along a circumferential path.

10. A centrifuge according to claim 1 wherein the slots lie along a path which is at an angle to the axis of rotation.

11. A centrifuge according to claim 1 wherein the apertures of the basket/cage combination are rectangular.

12. A centrifuge according to claim 1 wherein the apertures of the basket/cage combination are circular or elliptical.

13. A centrifuge according to claim 1 wherein the screen portion comprises screen elements which are inserted into the apertures of the basket/cage combination.

* * * * *